US010677331B2

United States Patent
Becka et al.

(10) Patent No.: US 10,677,331 B2
(45) Date of Patent: Jun. 9, 2020

(54) VERTICAL MILL GEARBOX

(71) Applicant: SIEMENS AKTIENGESELLSCHAFT, München (DE)

(72) Inventors: Simon Becka, Essen (DE); Steffen Brun, Borken (DE); Matthias Friedrich, Bocholt (DE); Guido Josten, Bocholt (DE); Robert Prusak, Gelsenkirchen (DE); Eugen Schlegel, Oberhausen (DE); Dirk Schroer, Rhede (DE); Michael Tegelkamp, Bocholt (DE); Franz Schmeink, Bocholt (DE)

(73) Assignee: FLENDER GMBH, Bocholt (DE)

( * ) Notice: Subject to any disclaimer, the term of this patent is extended or adjusted under 35 U.S.C. 154(b) by 178 days.

(21) Appl. No.: 16/007,252

(22) Filed: Jun. 13, 2018

(65) Prior Publication Data

US 2018/0363747 A1   Dec. 20, 2018

(30) Foreign Application Priority Data

Jun. 14, 2017   (EP) ..................................... 17176001

(51) Int. Cl.
  *B02C 1/00*  (2006.01)
  *F16H 37/04*  (2006.01)
  (Continued)

(52) U.S. Cl.
  CPC ......... *F16H 37/041* (2013.01); *B02C 15/006* (2013.01); *F16D 1/02* (2013.01);
  (Continued)

(58) Field of Classification Search
  CPC ............ B02C 1/00; F16H 37/041; F16H 1/46
  See application file for complete search history.

(56) References Cited

U.S. PATENT DOCUMENTS 3,037,429 A * 6/1962 Schurger ................ B23Q 5/045
                                                      409/215
3,656,695 A * 4/1972 Bacharach ............ B02C 15/006
                                                      241/103
(Continued)

FOREIGN PATENT DOCUMENTS

CH       694244 A5    10/2004
DE     2707699 A1     8/1978
(Continued)

*Primary Examiner* — Tisha D Lewis
(74) *Attorney, Agent, or Firm* — Henry M. Feiereisen LLC

(57) ABSTRACT

A vertical mill gearbox includes a drive shaft mounted in a casing for rotation about a rotation axis, and an intermediate shaft configured as a hollow shaft and mounted in the casing for rotation about a vertical second rotation axis. The intermediate shaft has a bevel gear meshing with a bevel-gear pinion of the drive shaft. A torsion shaft is received in fixed rotative engagement with the intermediate shaft and sized to extend beyond the intermediate shaft to define a projecting section to which a sun gear rotatably driven via the intermediate shaft is fixed. A planet carrier is mounted in the casing for rotation about the second rotation axis and rotatably supports an internal gear having an internal tooth system. Mounted to the planet carrier is a rotatable planet gear which meshes with the sun gear and with the internal tooth system of the internal gear.

16 Claims, 1 Drawing Sheet

(51) Int. Cl.
  *F16H 1/46* (2006.01)
  *B02C 15/00* (2006.01)
  *F16H 3/54* (2006.01)
  *F16D 1/02* (2006.01)
  *F16D 1/10* (2006.01)
  *F16H 57/00* (2012.01)
  *F16H 57/04* (2010.01)

(52) U.S. Cl.
  CPC .............. *F16D 1/10* (2013.01); *F16H 3/54* (2013.01); *F16H 57/0006* (2013.01); *F16H 57/0025* (2013.01); *F16H 57/043* (2013.01); *F16H 57/0486* (2013.01); *F16H 57/0495* (2013.01); *B02C 15/007* (2013.01); *F16D 2001/102* (2013.01); *F16D 2001/103* (2013.01)

(56) References Cited

U.S. PATENT DOCUMENTS

| | | | |
|---|---|---|---|
| 4,210,291 A * | 7/1980 | Kienast | B02C 15/006 241/110 |
| 6,344,011 B1 | 2/2002 | Hosle | |
| 8,678,307 B2 * | 3/2014 | Rittler | B02C 15/006 241/101.2 |
| 8,834,312 B2 | 9/2014 | Schmeink et al. | |
| 9,951,859 B2 | 4/2018 | Becka | |
| 9,956,870 B2 | 5/2018 | Schmeink et al. | |
| 2013/0035189 A1 | 2/2013 | Schmeink et al. | |
| 2016/0230842 A1 | 8/2016 | Schmeink et al. | |
| 2016/0312877 A1 | 10/2016 | Becka | |
| 2016/0375442 A1 | 12/2016 | Schmeink et al. | |
| 2017/0080799 A1 | 3/2017 | Schmeink et al. | |

FOREIGN PATENT DOCUMENTS

| | | |
|---|---|---|
| GB | 2001553 A | 2/1979 |
| WO | WO 2016198146 A1 | 12/2016 |

* cited by examiner

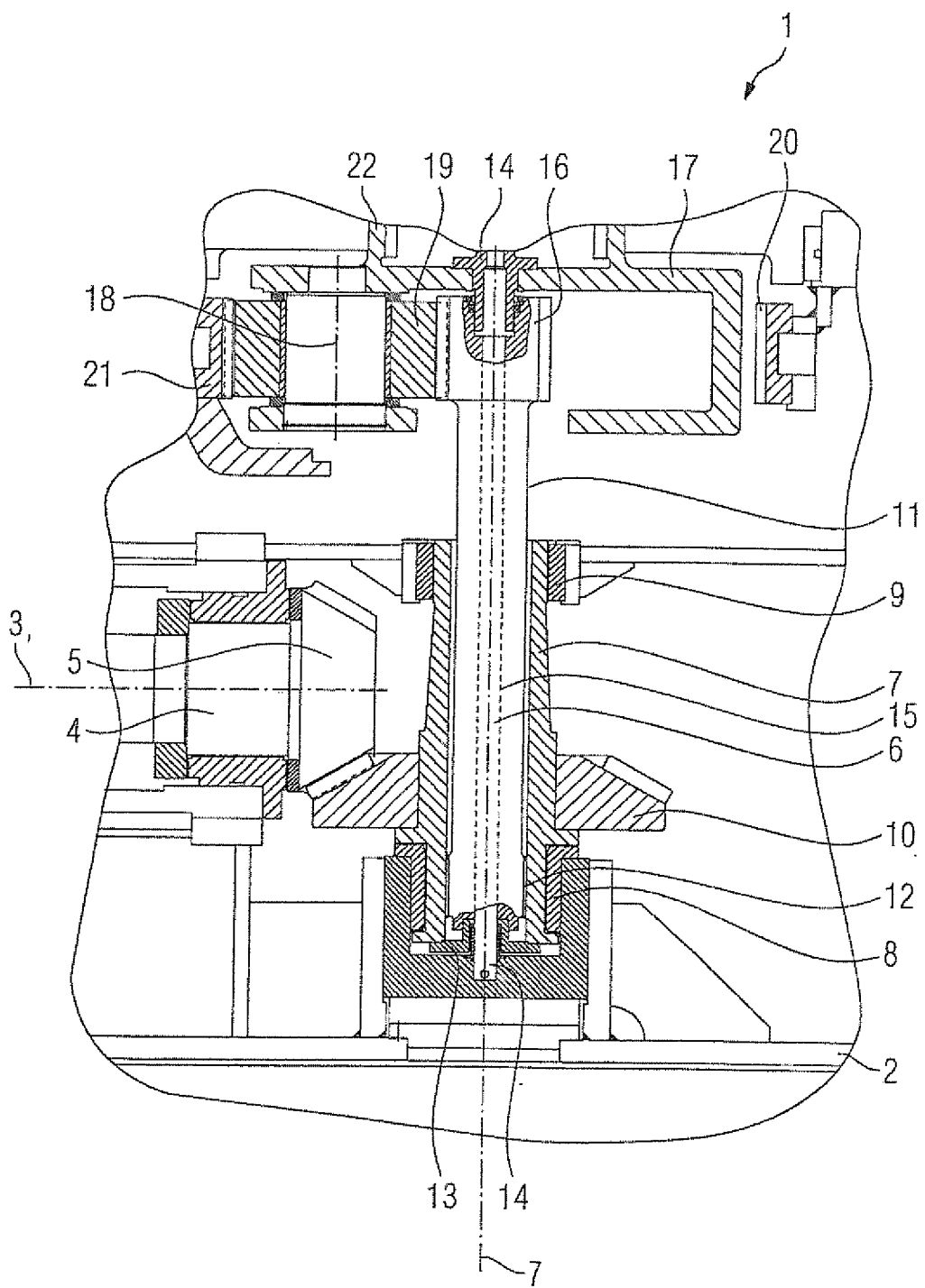

VERTICAL MILL GEARBOX

CROSS-REFERENCES TO RELATED APPLICATIONS

This application claims the priority of European Patent Application, Serial No. 17176001.0, filed Jun. 14, 2017, pursuant to 35 U.S.C. 119(a)-(d), the disclosure of which is incorporated herein by reference in its entirety as if fully set forth herein.

BACKGROUND OF THE INVENTION

The present invention relates to a vertical mill gearbox.

The following discussion of related art is provided to assist the reader in understanding the advantages of the invention, and is not to be construed as an admission that this related art is prior art to this invention.

Vertical mill gearboxes are known in various designs and are used to convert torque and speed in magnitude and direction, and to accommodate and support process loads. A vertical mill gearbox can have a first planetary stage to drive a second output-end planetary stage. During grinding process, vibrations are generated which excite natural frequencies of the drive train formed, i.a., by a motor, a coupling, and a drive shaft that is driven by the motor and coupling. Such natural frequencies can destroy the drive train at least in parts or completely. Usually the weakest element in the drive train is the most prone to damage. In vertical mill gearboxes this is usually a bevel-gear stage formed by a bevel-gear pinion and a bevel gear. The purpose of the bevel-gear stage is to convert the torque and speed in respect of magnitude and direction. The torque is transmitted from the bevel gear pinion to the bevel gear. The latter transfers the torque to a vertical intermediate shaft. Resulting forces in the toothing cause the intermediate shaft to be deformed, thereby affecting the load-bearing behavior of the planetary pre-stage. For statically determinate design, planetary stages require at least one freely adjustable member which in a vertical mill gearbox is constituted by a planet carrier. As a result of the equilibrium of forces arising and manufacturing tolerances achieved, the toothed gears rolling off into one another can freely adjust and can shift the planet carrier radially with respect to a rotation axis within a small and permissible range. In addition, these displacements of the planetary pre-stage have an effect on the load-bearing behavior of the bevel-gear stage. Studies have also shown that deformations due to the forces of the bevel-gear stage are superimposed on process-load-induced deformations and displacements of other elements of the vertical mill gearbox.

Process loads resulting from the grinding operation, the displacements of the adjustable-movement members of the planetary stages and the deformation resulting from the bevel-gear stage adversely affect the load-bearing behavior of the toothing in the planetary pre-stage and the bevel-gear stage. In addition, the bevel-gear stage is prone to vibrations and jolts caused by the process loads. Additional stress therefore builds up in the drive train, causing damage or requiring overdimensioning.

It would therefore be desirable and advantageous to provide an improved vertical mill gearbox to obviate prior art shortcomings.

SUMMARY OF THE INVENTION

According to one aspect of the present invention, a vertical mill gearbox includes a casing, a drive shaft mounted in the casing for rotation about a substantially horizontal first rotation axis, the drive shaft having one end provided with a bevel-gear pinion, an intermediate shaft configured as a hollow shaft and mounted in the casing for rotation about a substantially vertical second rotation axis, the intermediate shaft having a lower region provided with a bevel gear in meshing engagement with the bevel-gear pinion of the drive shaft, a torsion shaft received in the intermediate shaft in fixed rotative engagement with the intermediate shaft, the torsion shaft configured to extend beyond the intermediate shaft to define a projecting section, a sun gear rotatably driven via the intermediate shaft and fixed to the projecting section of the torsion shaft, a planet carrier mounted in the casing for rotation about the second rotation axis, an internal gear fixedly retained on the casing and having an internal tooth system, and a planet gear rotatably supported by the planet carrier, the planet gear meshing with the sun gear and with the internal tooth system of the internal gear.

In accordance with the present invention, a vertical mill gearbox is proposed in which the intermediate shaft implemented as a hollow shaft has accommodated therein a torsion shaft which is connected to the intermediate shaft by form fit or force fit and thus connected thereto in fixed rotative engagement and yet having angularly adjustable movement. Advantageously, this connection of the torsion shaft to the hollow shaft is provided at a point of low deflection of the hollow shaft.

According to another advantageous feature of the present invention, the torsion shaft and the sun gear can be made in one piece.

According to another advantageous feature of the present invention, a radial-axial bearing can be provided to support the intermediate shaft in the lower region thereof, and a radial bearing can be provided to support the intermediate shaft in an upper region thereof. In this way, forces and deformations from the bevel-gear stage are absorbed in the casing and not transferred to the toothing of the pre-stage or following stages of the drive train.

Unlike the prior art, in which a bevel gear is mounted on an intermediate shaft in the form of a solid shaft, the bevel gear in accordance with the present invention is mounted on an intermediate shaft implemented as a hollow shaft which is mounted rigidly in bearings, while the sun gear is mounted on the torsion shaft that is inserted in the intermediate shaft in fixed rotative engagement. As a result, deformations and displacements caused by process loads and stress on the bevel gear are decoupled from one another. In addition, thanks to the rotationally soft torsion shaft, torsional vibrations from the grinding process are damped by the bevel-gear stage, thereby achieving overall a long service life of a vertical mill gearbox according to the present invention.

According to another advantageous feature of the present invention, the torsion shaft can be connected to the intermediate shaft via a toothed coupling. Advantageously, the toothed coupling can be provided at a point of low deflection in the intermediate shaft, with the radial-axial bearing being disposed externally on the intermediate shaft in surrounding relationship to the toothed coupling.

According to another advantageous feature of the present invention, the torsion shaft has a spring stiffness which can be defined by a parameter selected from the group consisting of a length, diameter, weight, and material of the torsion shaft so as to adjust a natural frequency of the torsion shaft, with the torsion shaft having a bore extending along the second rotation axis to change the spring stiffness. Advantageously, the bore in the torsion shaft may also be used to supply lubricating oil to upper lubrication points in the vertical mill gearbox.

According to another advantageous feature of the present invention, the radial-axial bearing and the radial bearing can be spaced from one another at a smallest possible distance, with the intermediate shaft being supported by these bearings in a rigid manner. This results in a rigid design of the intermediate shaft having the advantage of less impairment of the tooth contact pattern of the bevel-gear stage. The deflection of the hollow shaft is at its lowest in the bearings of the intermediate shaft, and the remaining deflection is governed only by the small bearing clearance or the lubrication gap height. These locations in the hollow shaft are particularly suitable for connection of the torsion shaft.

According to another advantageous feature of the present invention, the torsion shaft can be configured for insertion in the intermediate shaft from above and connected to the intermediate shaft via a form-fit connection. The toothed coupling may be configured as a spherical toothed or splined coupling, thereby achieving a simple design. Advantageously, the splined coupling can be provided in a lower region of the torsion shaft and the intermediate shaft. Thus, the torsion shaft is fixed to the intermediate shaft only in its lower region. As a result, the torsion shaft can compensate radial displacements of the planet carrier at the upper end of the shaft due to elastic bending of the long slender shank of the intermediate shaft. As the torsion shaft and the intermediate shaft are connected in a form-fit manner, they rotate at the same speed. This allows simple axial supporting of the torsion shaft on the lower end face thereof on the intermediate shaft base rotating at the same speed.

According to another advantageous feature of the present invention, the intermediate shaft can be made of a cast material. As an alternative, the intermediate shaft and bevel gear can be made as a one-piece forging.

The torsion shaft can be provided with an internal bore along the rotation axis so as to adjust the stiffness by changing the weight and the resistance torque and to convey lubricating oil through the rotation axis to the upper lubricating points in the vertical mill gearbox. Advantageously, a sealing connecting piece can be placed into an end of the bore for attachment of the oil supply.

According to another advantageous feature of the present invention, the torsion shaft can have a length sized to reduce a tilt angle of the sun gear in the event of displacement of the planet gear.

According to another advantageous feature of the present invention, the length of the torsion shaft can be used in a particularly simple manner to adjust the overall height of the vertical mill gearbox so as to best suit customer specifications for the vertical mill.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 shows a schematic partial sectional view of a portion of a vertical mill gearbox according to the present invention.

DETAILED DESCRIPTION OF PREFERRED EMBODIMENTS

The depicted embodiment is to be understood as illustrative of the invention and not as limiting in any way. It should also be understood that the FIGURE may not necessarily be to scale. In certain instances, details which are not necessary for an understanding of the present invention or which render other details difficult to perceive may have been omitted.

Turning now to the drawing, and in particular to FIG. 1, there is shown a schematic partial sectional view of a portion of a vertical mill gearbox according to the present invention, generally designated by reference numeral 1 for installation in a vertical mill. A vertical mill is used to grind different materials, such as lignite and anthracite coal, limestone, minerals, cement material or similar, and includes a horizontal grinding table (not shown) which is driven in a rotating manner via a motor (not shown) and the vertical mill gearbox 1 disposed between the motor and grinding table. Grinding takes place in a grinding bowl in which grinding tools press against the grinding table.

It will be appreciated by persons skilled in the art that the vertical mill gearbox 1 contains further components which do not appear in FIG. 1, form no part of the invention, and therefore have been omitted for the sake of simplicity.

The vertical mill gearbox 1 assumes the task of transmitting power, transferring a required torque and a required speed, supporting a grinding bowl and absorbing grinding forces. The vertical mill gearbox 1 includes a casing 2 and a drive shaft 4 which is mounted in the casing 2 in a substantially horizontal alignment for rotation about a first rotation axis 3 and sized to project outward from the casing 2. The drive shaft 4 is driven via a connected motor (not shown in greater detail) and has a free end which is disposed inside the casing 2. Provided on the free end of the drive shaft 4 is a bevel-gear pinion 5 which is connected in fixed rotative engagement to the drive shaft 4 in such a way that the drive shaft 4 and the bevel-gear pinion 5 are fit together by a shaft-hub joint, or that the drive shaft 4 and bevel-gear pinion 5 form a single-piece bevel-gear pinion shaft.

The vertical mill gearbox 1 further includes an intermediate shaft 7 which is mounted in the casing 2 for rotation about an essentially vertical second rotation axis 6 and which is braced against the casing 2 in a lower region thereof via a radial-axial bearing 8 and in an upper region thereof via at least one radial bearing 9. In the lower region, the intermediate shaft 7 supports in fixed rotative engagement a bevel gear 10 which meshes with the bevel-gear pinion 5 and, jointly therewith, forms a bevel-gear stage. Accordingly, the intermediate shaft 7 can be rotatably driven by the bevel-gear stage. In accordance with the present invention, the intermediate shaft 7 is configured as a hollow shaft and accommodates a torsion shaft 11 which in this case is also configured as a hollow-bore shaft and connected in fixed rotative engagement to the intermediate shaft 7.

The fixed rotative connection between the intermediate shaft 7 and the torsion shaft 11 is realized by a form-fitting and/or force-fitting toothed coupling 12 in the lower region of the intermediate shaft 11. The toothed coupling 12 is disposed centrally at the working point of the radial-axial bearing 8.

The torsion shaft 11 is inserted in the intermediate shaft 7 from above with radial play, is supported at the lower free end indirectly on the casing 2, and projects upwards from the intermediate shaft 7 beyond the intermediate shaft 7 to define a projection section. The torsion shaft 11 rests at the lower end with its end face via an end disk 13, provided with a central bore, upon the intermediate shaft 7. Inserted in the central bore are sealing connecting pieces 14 via which lubricating oil (not shown) can be conducted from the stationary casing 2 into the bore 15 of the torsion shaft 11 and from there into the upper lubrication points in the vertical mill gearbox 1. A sun gear 16 of the vertical mill gearbox 1 is fixed to the projecting section of the torsion shaft 11. A one-piece component is illustrated.

A planet carrier 17 is mounted in the casing 2 for rotation about the second rotation axis 6 and carries at least one planet gear 19 which is rotatable about a planet gear rotation axis 18 and which meshes with the sun gear 16 and with an internal tooth system 20 of an internal gear 21 that is fixedly retained on the casing 2. Although only a single planet gear 19 is shown in FIG. 1, it will be appreciated by persons skilled in the art that, of course, a plurality of planet gears 19 can be retained on the planet carrier 17 to thereby distribute a drive power to the planet gears 19 which therefore can be relatively compactly sized. A second planetary stage (not shown) can be disposed on top of the planet carrier 17 and connected in fixed rotative engagement via another driven coupling 22 to a sun gear (not shown) of the second planetary stage. The second planetary stage can then indirectly be connected on the driving side in fixed rotative engagement to the grinding table.

During operation, the drive shaft 4 is driven in a rotating manner via the motor. The rotary movement of the drive shaft 4 is transmitted to the intermediate shaft 7 at a predetermined transmission ratio via the bevel-gear stage, comprised of bevel-gear pinion 5 and bevel gear 10. The intermediate shaft 7 and the torsion shaft 11 rotate at the same speed and with them the sun gear 16. The sun gear 16 in turn rotates the planet carrier 17 via the planet gear(s) 19 meshing with the sun gear 16 and the internal gear 21 and in turn converts speed and torque in this gearing stage. Accordingly, the second planetary stage is driven in a rotating manner with the grinding table via the planet carrier 17 via the drive coupling 22.

The vertical mill gearbox 1 according to the present invention has the advantage that the sun gear 16, which is fixed to the torsion shaft 11, can independently follow a radial displacement of the planet carrier 17 as caused by the process loads, without adversely affecting the bevel-gear stage. In reverse direction, while the loads from the bevel-gear stage may cause elastic deformation of the intermediate shaft 7, this will not adversely affect the planetary stage. Decoupling of the deformations and displacements from the process loads and stress on the bevel gear 10 is achieved thanks to the torsion shaft 11 that supports the sun gear 16 and is disposed inside the intermediate shaft 7 which supports the bevel gear 10. Also contributing to this decoupling is the central arrangement of the toothed coupling 12 at the effective point of the radial-axial bearing 8. In addition, due to the appropriately selected spring stiffness of the torsion shaft 11, natural frequencies of the drive train are also shifted to a non-critical region where there is no risk of resonance and are thus decoupled from the vibrations produced by the grinding process, thereby achieving overall a long service life of the vertical mill gearbox 1 according to the invention. The individually determinable lengths of the torsion shaft 11 additionally result in a rotationally soft shaft similar to a torsion spring which damps shocks from the grinding process, so that these shocks have only a minimal effect on the bevel-gear stage.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A vertical mill gearbox, comprising:
   a casing;
   a drive shaft mounted in the casing for rotation about a substantially horizontal first rotation axis, said drive shaft having one end provided with a bevel-gear pinion;
   an intermediate shaft configured as a hollow shaft and mounted in the casing for rotation about an substantially vertical second rotation axis, said intermediate shaft having a lower region provided with a bevel gear in meshing engagement with the bevel-gear pinion of the drive shaft;
   a torsion shaft received in the intermediate shaft in fixed rotative engagement with the intermediate shaft, said torsion shaft configured to extend beyond the intermediate shaft to define a projecting section;
   a sun gear rotatably driven via the intermediate shaft and fixed to the projecting section of the torsion shaft;
   a planet carrier mounted in the casing for rotation about the second rotation axis;
   an internal gear fixedly retained on the casing and having an internal tooth system; and
   a planet gear rotatably supported by the planet carrier, said planet gear meshing with the sun gear and with the internal tooth system of the internal gear.

2. The vertical mill gearbox of claim 1, further comprising a radial-axial bearing configured to support the intermediate shaft in the lower region, and a radial bearing configured to support the intermediate shaft in an upper region thereof.

3. The vertical mill gearbox of claim 1, wherein the radial-axial bearing and the radial bearing are spaced from one another at a distance sufficient to rigidly support the intermediate shaft.

4. The vertical mill gearbox of claim 1, wherein the torsion shaft is configured for insertion in the intermediate shaft from above and connected to the intermediate shaft via a form-fit connection.

5. The vertical mill gearbox of claim 1, wherein the torsion shaft is connected by a form fit or force fit to the intermediate shaft via a toothed coupling.

6. The vertical mill gearbox of claim 5, wherein the toothed coupling is provided in a lower region of the torsion shaft and the intermediate shaft.

7. The vertical mill gearbox of claim 5, wherein the toothed coupling is configured as a spherical toothed or splined coupling.

8. The vertical mill gearbox of claim 5, wherein the toothed coupling is provided at a point of low deflection in the intermediate shaft, said radial-axial bearing being disposed externally on the intermediate shaft in surrounding relationship to the toothed coupling.

9. The vertical mill gearbox of claim 1, wherein the torsion shaft has a length which is a determinative for an overall height of the vertical mill gearbox.

10. The vertical mill gearbox of claim 1, wherein the torsion shaft has a length sized to reduce a tilt angle of the sun gear with respect to the planet gear.

11. The vertical mill gearbox of claim 1, wherein the torsion shaft has a spring stiffness which is defined by a parameter selected from the group consisting of a length, diameter, weight, and material of the torsion shaft so as to adjust a natural frequency of the torsion shaft, said torsion shaft having a bore extending along the second rotation axis to change the spring stiffness.

12. The vertical mill gearbox of claim 11, wherein the bore in the torsion shaft enables supply of lubricating oil to upper lubrication points in the vertical mill gearbox, and further comprising a sealing connecting piece placed into an end of the bore for attachment of an oil line system.

13. The vertical mill gearbox of claim 1, wherein the torsion shaft and the sun gear are made in one piece.

14. The vertical mill gearbox of claim 1, further comprising an end disk disposed at an axial end face of the intermediate shaft for axially supporting an end face of the torsion shaft.

15. The vertical mill gearbox of claim 1, wherein the intermediate shaft is made of a cast material.

16. The vertical mill gearbox of claim 1, wherein the intermediate shaft and the bevel gear is made as a one-piece forging.

* * * * *